(12) United States Patent
Yamada et al.

(10) Patent No.: US 7,585,106 B2
(45) Date of Patent: Sep. 8, 2009

(54) TEMPERATURE FIXED-POINT CELL, TEMPERATURE FIXED-POINT DEVICE AND METHOD OF CALIBRATION OF THERMOMETER

(75) Inventors: Yoshiro Yamada, Tsukuba (JP); Naohiko Sasajima, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 69 days.

(21) Appl. No.: 11/678,370

(22) Filed: Feb. 23, 2007

(65) Prior Publication Data
US 2007/0201534 A1 Aug. 30, 2007

(30) Foreign Application Priority Data
Feb. 24, 2006 (JP) .............................. 2006-048256

(51) Int. Cl.
*G01K 15/00* (2006.01)
*G01K 19/00* (2006.01)

(52) U.S. Cl. .................. 374/2; 374/1; 374/16; 374/121
(58) Field of Classification Search .................. 374/1–3
See application file for complete search history.

(56) References Cited

U.S. PATENT DOCUMENTS

| | | | | |
|---|---|---|---|---|
| 3,513,705 | A | * | 5/1970 | Severin ........................ 374/106 |
| 4,469,512 | A | * | 9/1984 | Shingu et al. .................. 75/404 |
| 5,139,332 | A | * | 8/1992 | Kitaoka et al. ............ 356/243.2 |
| 5,608,838 | A | * | 3/1997 | Brookley ..................... 392/407 |
| 6,398,405 | B1 | * | 6/2002 | Yamada .......................... 374/1 |
| 6,641,299 | B2 | * | 11/2003 | Sasajima et al. ................ 374/2 |
| 6,939,035 | B2 | * | 9/2005 | Machin .......................... 374/2 |
| 7,063,457 | B2 | * | 6/2006 | Kang et al. ..................... 374/3 |
| 2002/0122457 | A1 | * | 9/2002 | Sasajima et al. ................ 374/2 |

(Continued)

FOREIGN PATENT DOCUMENTS

JP           2987459          10/1999

(Continued)

OTHER PUBLICATIONS

Metal Carbide-Carbon Eutectic and Peritectic Fixed points as High-temperature Standards; Naohiko Sasajima, Yoshibo Yamada; National Metrology Institute of Japan; 2006.*

(Continued)

*Primary Examiner*—Patrick J Assouad
*Assistant Examiner*—Bret Adams
(74) *Attorney, Agent, or Firm*—Oblon, Spivak, McClelland, Maier & Neustadt, P.C.

(57) ABSTRACT

A temperature fixed-point cell is configured with a crucible composed of carbon and a fixed-point material enclosed in the crucible. The fixed-point material has a peritectic structure of carbon and a carbon compound. A thermometer is calibrated by installing the temperature fixed-point crucible in a furnace, increasing or decreasing the ambient temperature thereof, measuring the temperature of the temperature fixed-point cell with the thermometer, observing the state of temperature change, and using this state of temperature change as a basis for the calibration. This invention is aimed at realizing a fixed point in the temperature range exceeding the copper point and accomplishing great improvement in accuracy in the calibration of radiation thermometers, thermocouples and all thermometers used in high temperature ranges.

17 Claims, 6 Drawing Sheets

U.S. PATENT DOCUMENTS

2008/0317088 A1    12/2008    Yamada

FOREIGN PATENT DOCUMENTS

JP    3404531    3/2003

OTHER PUBLICATIONS

Daisaki Kobayashi; "Correct Usage of Thermometer"; Mar. 31, 1997, First Edition; pp. 281-283 with English Translation.

T. J. Quinn, et al.; "The Freezing Point of Platinum Determined by the NPL Photoelectric Pyrometer"; 1972; Temperature, It's Measurement and Control in Science and Industry, vol. Four, Part 1, pp. 295-309.

Peter B. Coates, et al; "A New Determination of the Freezing Point of Palladium"; Apr. 5, 1983; High Temperatures-High Pressures, vol. 15, pp. 573-582.

H. Sakate, et al. "Observation of Al2O3 Melting and Freezing Plateaus Using a Cavity-type Tungsten Crucible"; 1995; Metrologia, vol. 32, pp. 129-131.

Hisashi Itoh; "The Ag-Cu Eutectic Point as a Reference Temperature"; Sep. 7, 1983, pp. 978-982.

F. Sakuma, et al.; Establishing a Practical Temperature Standard by Using a Narrow-band Radiation Thermometer with a Silicon Detector; 1982; Temperature, It's Measurement and control in Science and Industry, vol. Five, pp. 421-427.

N. Sasajima, et al.; "Dependence of Iron-Carbon Eutectic Melting on Pre-Freezing Rate and Annealing Conditions"; 2004; Tempmeko, pp. 195-202.

"Measurement and Control"; Nov. 2003; vol. 2, No. 11, pp. 918-921 with English Abstract.

Bruce Chalmers; "Principles of Solidification"; 1971; pp. 206-211 and 224-227 (English Translation).

* cited by examiner

TEMPERATURE FIXED-POINT CELL, TEMPERATURE FIXED-POINT DEVICE AND METHOD OF CALIBRATION OF THERMOMETER

BACKGROUND OF INVENTION

1. Field of the Invention

This invention relates to a temperature fixed-point cell and a temperature fixed-point device required for the calibration of such thermometers as radiation thermometer and thermocouple that are used in the high-temperature range exceeding 1000° C.

2. Description of the Prior Art

In the calibration of a thermometer above the normal room temperature, the freezing point or the melting point of a metal is adopted as the defining fixed point and the fixed-point cell is used as a means to realize the temperature scale. This means is generally a crucible that is made of graphite having a pure metal cast therein. The calibration of the thermometer is accomplished by measuring the temperature of the interior of the cell with the thermometer, placing the fixed-point cell in a temperature-variable furnace, observing the change of temperature of the cell taking place when the ambient temperature is increased or decreased, and utilizing the phenomenon that the change of temperature is caused to vanish by the latent heat of melting or freezing in the state where the liquid phase and the solid phase coexist (refer to "Newly Compiled Edition: Correct Way to Use of Thermometer" edited by (Juridical Person) Japan Electrical Measuring Instrument Industry Society, Chapter 7, published by Japan Industrial Publishing Co., Ltd. (1997)).

The highest temperature of the defining fixed point is the copper point, 1085° C. In the temperature range exceeding the copper point, the temperature scale is defined by extrapolation. In the temperature range exceeding the copper point, the scale is maintained by utilizing a radiation thermometer that has undergone fixed-point calibration below the copper point or by utilizing the relation between the radiance and the electrical current of a filament lamp using a tungsten ribbon as the filament.

An idea of using the freezing point of palladium (1550° C.) or platinum (1770° C.) with a view to realizing a fixed point in the temperature range exceeding the copper point has been tried and experiments of measuring the fixed-point temperatures by melting such a material in a crucible made of alumina has been reported (refer to Quinn, T. J., Chandler, T. R D.: Temperature, Its Measurement and Control in Science and Industry, Plumb, H. H. (ed.), Vol. 4, Part 1, p. 295, Pittsburgh: Instrument Society of America (1972) and Coates, P. B., Chandler, T. R D., Andrews, J. W., High Temperature and High Pressure, Vol. 15, p. 573(1983)).

An idea of using tungsten as the material for a crucible, melting alumina in the crucible, observing the melting and the freezing of alumina at 2050° C. with a radiation thermometer, and adopting the melting point as the fixed point has been tried and reported (refer to Sakate, H., Sakuma, F., Ono, A., Metrologia, Vol. 32, p. 129, (1995)).

In the calibration of a thermocouple, the practice of resorting to the calibration by the palladium wire method in addition to the calibration at the copper point (1085° C.) or the gold point (1064° C.) is commonly practiced. This is a method that consists in inserting a purely metallic palladium wire into the leading terminal of a thermocouple, increasing the temperature of the wire in a heating furnace, and observing the temperature at which the wire temperature, while the wire melts, assumes a state of plateau.

On the other hand, an idea of using a metal-metal eutectic alloy for a temperature fixed point has been tried. For example, an idea of realizing a fixed point by casting a copper-silver eutectic alloy or a copper-aluminum eutectic alloy in a crucible made of graphite and observing the melting and the freezing of the eutectic alloy has been reported (refer to Ito, Transaction of The Society of Instrumentation and Control Engineers, Vol. 19, No. 12, p. 978 (1983)).

Then, a temperature fixed-point cell that is formed of a crucible that is made of graphite and using a metal-carbon eutectic alloy as a fixed-point material and enclosing the fixed-point material therein has been disclosed (refer to Japanese Patent No. 2987459). This invention enables realizing a plurality of temperature fixed points between 1100° C. and 2500° C.

Further, a temperature fixed-point cell that is formed of a crucible made of graphite and using a metal carbide-carbon eutectic alloy as a fixed-point material and enclosing the fixed-point material therein has been disclosed (refer to Japanese Patent No. 3404531). This invention enables realizing a plurality of temperature fixed points between 2500° C. and 3200° C.

The fixed point of highest temperature attained in all the conventional fixed-point cells constructed by preparing a crucible made of graphite and causing pure metals to be cast in this crucible is the copper point, 1085° C. This is because the melting of a metal having a melting point higher than this highest temperature in a crucible made of graphite induces dissolution of the graphite from the crucible and consequently lowers the purity of the metal and brings a decrease in the freezing point.

Since the temperature fixed points that are available for temperature scale realization are restricted to below the copper point of 1085° C. owing to the absence of a fixed-point cell capable of affording a fixed point exceeding the copper point, the interpolated temperature scale using four fixed points from the zinc point to the copper point and ranging from 400° C. to 1100° C. have been proposed (F. Sakuma and S. Hattori, "Establishing a Practical Temperature Standard by Using a Narrow-Band Radiation Thermometer with a Silicon Detector," in Temperature: Its Measurement and Control in Science and Industry, 5 (Schooley et al. ed.), AIP, New York (1982) 421-427). It is, however, pointed out in the cited reference that when interpolated scale realized with fixed points not exceeding 1100° C. are extrapolated up to a high temperature exceeding 1100° C., the relevant accuracy is markedly degraded.

The dissemination of temperature scale exceeding the copper point, therefore, has been implemented by using a radiation thermometer of high accuracy as the instrument being calibrated, with the scale being set by the extrapolation method based on fixed-point calibration at the copper point and the evaluation of the optical property of the given thermometer. The scale uncertainty consequently attained is barely about 1° C. for 2000° C. because this realization involves tremendous labor in performing accurate evaluation of characteristic properties and on the other hand because the realization of temperature scale exceeding the copper point by extrapolation increases the uncertainty as the temperature departs from the copper point.

The strip lamp necessitates a correction dependent on the measurement wavelength because the emissivity of the tungsten ribbon used as the filament is not 1. The strip lamp, therefore, has allowed no easy utilization with high accuracy and has as well necessitated filling of an inert gas in the bulb of the lamp because a temperature exceeding 2000° C. induces vaporization of the tungsten ribbon. The gas strip lamp, however, is incapable of acquiring stable properties owing to the fact that the inert gas filled in the bulb causes convection.

The aforementioned method that uses a crucible made of alumina and utilizes the freezing point of palladium or platinum as the fixed point allows effective use for a short-term measurement. Since alumina is vulnerable to thermal shock, the crucible made of alumina entails such a problem as sustaining fracture after repeated use. Thus, the aforementioned method that uses a crucible made of alumina is destitute of serviceability.

Even the calibration of a thermocouple by the palladium wire method entails the problem that the accuracy of interpolation is degraded because the reproducibility of temperature measurement is barely about 1° C. and also because even the copper point that is the nearest fixed point is separated by about 500° C. Thus, the aforementioned method of temperature calibration that implements the calibration of a thermocouple by the palladium wire method is incapable of acquiring fully sufficient accuracy.

The aforementioned method that realizes the fixed point by melting alumina in a crucible made of tungsten entails such problems as incurring difficulty in enclosing molten aluminum in a crucible of a horizontal type because of inferior workability of tungsten and in forming a blackbody cavity having emissivity close to 1 in the crucible because of low material emissivity of tungsten. The aforementioned method that uses a crucible made of tungsten, therefore, has low feasibility and is incapable of obtaining fully satisfactory accuracy.

The aforementioned method that uses a metal-metal eutectic alloy for the temperature fixed point is aimed at increasing the number of fixed points in the temperature range below the copper point. When this method is used above the copper point, however, the fixed point cannot be realized because the depression of the freezing point due to the dissolution of graphite from the crucible made of graphite is inevitable.

The aforementioned method that uses a metal-carbon eutectic alloy as the fixed-point material uses an alloy of invariably expensive noble metals as the fixed-point material in the temperature range from 1400° C. to 2300° C. It is, however, preferable to use as inexpensive a material as possible as the fixed-point material.

According to the aforementioned method that uses a metal carbide-carbon eutectic alloy as the fixed-point material, it is made possible to realize a titanium carbide-carbon eutectic point at temperatures in the neighborhood of 2750° C., for example. The titanium powder that is indispensable in the manufacture of a cell, however, is highly flammable and dangerous because it manifests high reactivity with oxygen and nitrogen in the air. Further, owing to the high reactivity mentioned above, the titanium powder of high purity itself is difficult to produce and is not readily available.

Further, the aforementioned method that uses a metal-carbon eutectic alloy and a metal carbide-carbon eutectic alloy for the fixed-point material entails the problem that the fixed-point material forms a solidified state possessing a structure such that the two layers are entangled in a lamellate shape or a flaky shape and the size of the solidified structure brings an effect on the energy equilibrium during the course of melting or freezing. Even in accordance with the aforementioned method that uses a metal-carbon eutectic alloy, therefore, the state of a sufficiently flat plateau cannot be obtained during the melting of the fixed-point material. (N. Sasajima, Y. Yamada, P. Bloembergen and Y. Ono, Proc. TEMPMEKO 2004, p. 196(2005)).

This invention has been aimed at overcoming the problems incurred by the conventional techniques as described above and realizing a fixed point in the temperature range exceeding the copper point with the object of accomplishing great improvement of the accuracy of the calibration of radiation thermometers, thermocouples, and all other thermometers of the kind used in a high temperature range.

SUMMARY OF THE INVENTION

To solve the problems, the present invention provides as the first aspect thereof a temperature fixed-point cell comprising a crucible composed of carbon and a fixed-point material enclosed in the crucible and having a peritectic structure formed of a carbide and carbon.

The invention provides as the second aspect thereof a temperature fixed-point device comprising the temperature fixed-point cell according to the first aspect and a temperature-variable electric furnace that or decreases or decreases an ambient temperature of the temperature fixed-point cell and enables a change in temperature of the temperature fixed-point cell to be measured with a thermometer.

The invention provides as the third aspect thereof a temperature fixed-point device comprising the temperature fixed-point cell according to the first aspect and a temperature-variable electric furnace that increases or decreases an ambient temperature of the temperature fixed-point cell and enables a change in intensity of light emitted by the temperature fixed-point cell to be measured with an illuminance meter or a radiometer.

This invention provides as the fourth aspect thereof provides a method for calibrating a thermometer comprising the steps of increasing or decreasing an ambient temperature of the temperature fixed-point cell according to the first aspect, measuring a temperature of the temperature fixed-point cell with a thermometer, and calibrating the thermometer based on a state of change of the measured temperature.

The carbide prefers to be the carbide of manganese, chromium, aluminum, plutonium, silicon or tungsten.

The thermometer prefers to be a radiation thermometer or a thermocouple.

This invention produces an industrially, scientifically and technologically prominent effect of enabling great improvement of the accuracy of temperature calibration in the high temperature range in which the conventional technique has been unable to attain fully satisfactory accuracy owing to the unavailability of a means to calibrate a thermometer and to the inaccuracy of temperature scale.

This invention enables the calibration by interpolation between fixed points of such a thermometer as, for example, a radiation thermometer or a thermocouple whose temperature scale in the temperature range exceeding the copper point, 1085° C., have not been heretofore obtained with satisfactory accuracy owing to the calibration's dependence on the extrapolation method. This invention, therefore, is capable of markedly enhancing the accuracy of setting the temperature scales of the thermometer in the high temperature range.

This invention enables maintenance of the scale with a fixed point and a radiation thermometer without using a temperature standard strip lamp that has been heretofore used for the maintenance of temperature scales.

This invention, because of the ability thereof to calibrate temperature scales in a high temperature range by interpolation, obviates the necessity of performing such accurate evaluation of properties of a highly accurate standard radiation thermometer as has prevailed heretofore. This invention, therefore, is capable of markedly simplifying the work of calibration and consequently promoting the maintenance of the system for disseminating the temperature scale.

This invention, as compared with the conventional method that uses a metal-carbon eutectic alloy as the fixed point material developed with the object of accomplishing highly accurate calibration of a thermometer enables unusually inexpensive manufacture of a fixed-point cell that can be used in a temperature range from 1400° C. to 2500° C.

The conventional method has been unable to attain the accuracy of a metal carbide-carbon eutectic point in a high temperature range exceeding 2500° C. as by reason of difficulty incurred in securing a highly pure metal powder. By contrast, this invention is capable of using an easily procurable highly pure tungsten powder and consequently realizing a highly accurate fixed point owing to the use of a tungsten carbide-carbon (hereinafter abbreviated as "WC-C") peritectic point as the fixed point.

This invention obviates the necessity of using the palladium wire method in the calibration of a thermocouple.

This invention, in the development of a thermocouple for use at a high temperature in future, enables the evaluation of such properties as stability and nonuniqueness of the thermocouple to be carried out with high accuracy. Thus, this invention contributes to improving the properties of the thermocouple as well.

The above and other objects, characteristic features and advantages of the present invention will become apparent to those skilled in the art from the description to be give herein below with reference to the accompanying drawings.

BRIEF DESCRIPTION OF THE DRAWINGS

FIG. 3($a$) is a cross section of a temperature fixed-point cell of Example 1 and FIG. 3($b$) is a cross section of a temperature fixed-point device of this invention having the temperature fixed-point cell of Example 1 disposed therein.

FIG. 4($a$) is a view showing an example of the output of a thermometer allocated for calibration obtained by the temperature fixed-point device of this invention illustrated in FIG. 3($b$) and FIG. 4($b$) is a view showing an example of the output of the thermometer allocated for calibration obtained by the temperature fixed-point device of this invention illustrated in FIG. 3($b$).

DETAILED DESCRIPTION OF THE PREFERRED EMBODIMENTS

Embodiments of a temperature fixed-point cell, a temperature fixed-point device and a method of calibration of a thermometer according to the present invention will be described hereinafter with reference to the accompanying drawings based on the examples.

This invention is characterized by using as a fixed-point cell a crucible composed of carbon, forming in the crucible a carbide resulting from mixing a pure substance and carbon, and adopting as the temperature fixed point the temperature of equilibrium between the melting and freezing phases at the peritectic point. Incidentally, as the aforementioned crucible composed of carbon, it is preferable to use a crucible made of graphite.

The method for calibrating a thermometer according to this invention implements the calibration of a thermometer by installing the fixed-point cell in a temperature-variable electric furnace, measuring the temperature in the electric furnace with the thermometer subjected to the calibration, observing the change of temperature of the cell taking place when the ambient temperature of the fixed-point cell is increased or decreased, and utilizing the phenomenon that the change of temperature is made to disappear by the latent heat of melting or freezing in the state allowing coexistence of the liquid phase and the solid phase.

As the fixed-point material to be used in this invention, a metal carbon compound that forms a peritectic structure with carbon is used. Though numerous metal alloys exist which form a peritectic structure, the case wherein one of the two pertinent substances is carbon is handled herein. Further, many of the compounds that are composed of metals and carbon form a peritectic structure. Here, the peritectic structures between two different kinds of metal carbon compounds are not handled and only the metal carbon compounds that form a peritectic structure with carbon are handled. To be specific, a carbon compound of manganese, chromium, aluminum, plutonium, silicon or tungsten is utilized.

Figure 1:
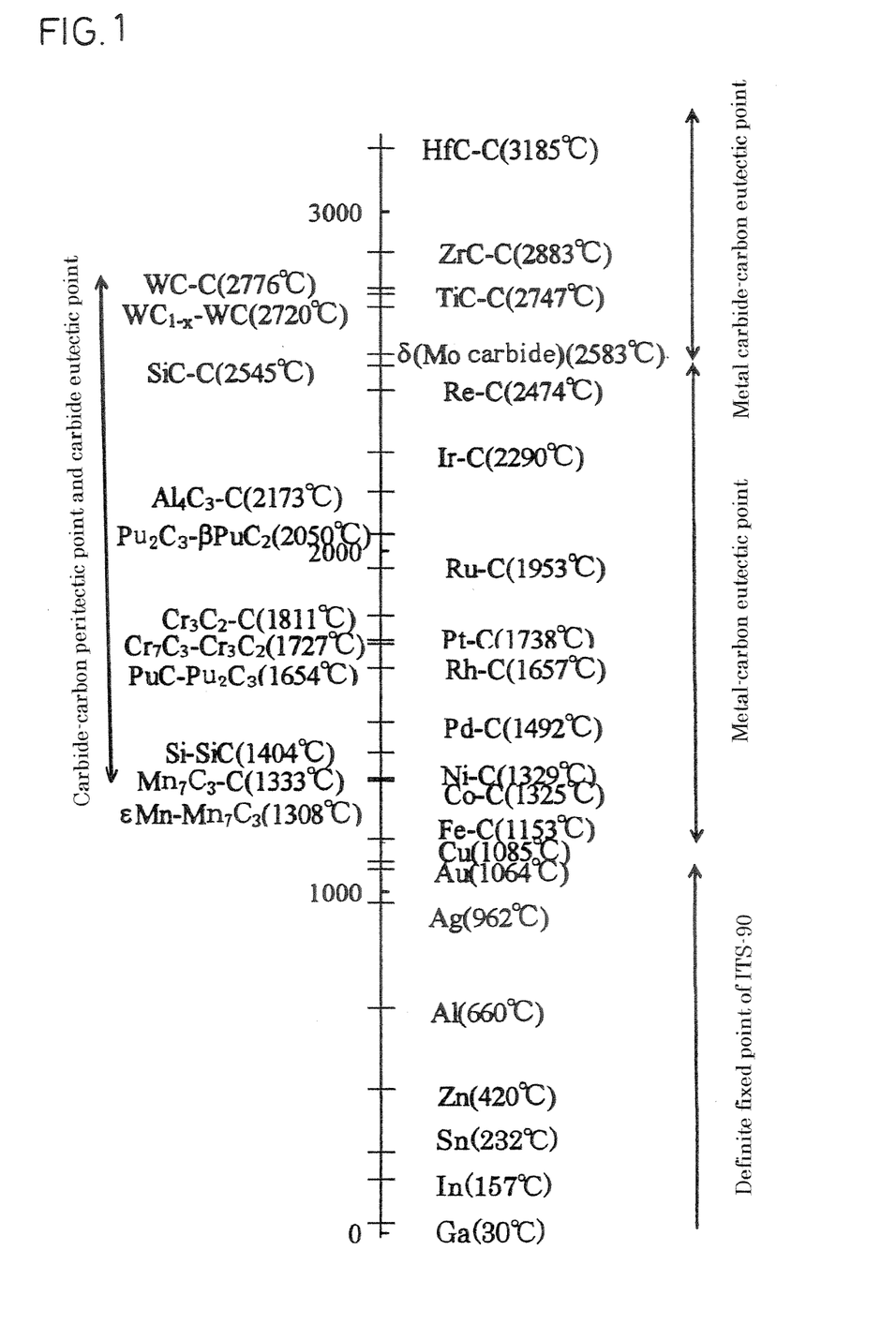
FIG. 1 shows a list of fixed-point temperatures of carbide-carbon peritectic alloys used in this invention and pure metal fixed points, metal-carbon eutectic points, and metal carbide-carbon eutectic point temperatures used heretofore.

The fixed-point temperature of this invention is shown in FIG. 1 in conjunction with the temperature fixed point by the metal-carbon eutectic and the temperature fixed point by the metal carbide-carbon eutectic Referring to this diagram the temperature values of the metal-carbon eutectic fixed points and the metal carbide-carbon eutectic fixed points are based on Yamada, Journal of The Society of Insrumentation and Control Engineers, Vol. 42, No. 11, p. 918 (published in 2003). The highest of the defining fixed points in the existing International Temperature Scale of 1990 (ITS90) is the copper point, 1085° C., as shown in the right lower side. The temperature fixed points of the metal-carbon eutectic alloy and the metal carbide-carbon eutectic alloy exist in the range from 1153° C. to 3185° C., both shown above the copper point.

The peritectic points of this invention are WC—C, SiC—C, $Al_4C_3$—C, $Cr_3C_2$—C, $Mn_7C_3$—C, etc. shown on the left side of FIG. 1. Though the peritectic point of the peritectic structure between $\beta PuC_2$ and carbon exists in the neighborhood of 2300° C. besides those enumerated above, it is not shown in FIG. 1 because the temperature value thereof is indistinct.

As demonstrated herein below, the fixed-point material in the temperature fixed-point cell of this invention, even after undergoing the first solidification at the peritetic point, allows survival of the liquid phase in the cell and occasionally permits the surviving liquid phase to undergo the second solidification at the eutectic points or the peritectic points between two carbon compounds, which have lower temperature values. Examples of such eutectic points and peritectic points are $WC_{1-x}$—WC eutectic point, $Pu_2C_3$—$\beta PuC_2$ peritectic point, $Cr_7C_3$—$Cr_3C_2$ eutectic point, PuC—$Pu_2C_3$ peritectic point, Si—SiC eutectic point and $\epsilon Mn$—$Mn_7C_3$ peritectic point. Their temperature values are also shown on the left side of FIG. 1.

Figure 2:
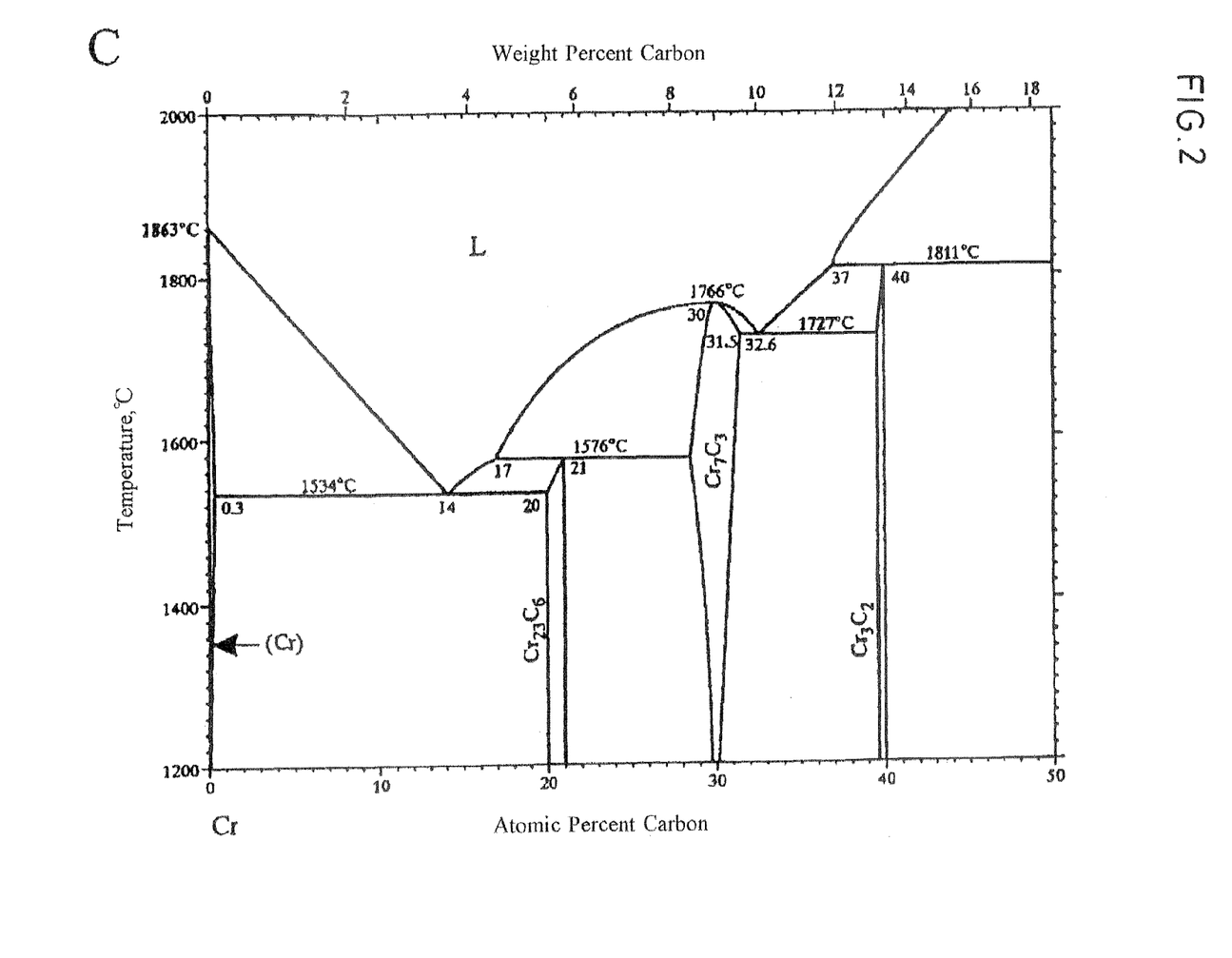
FIG. 2 depicts one example of the phase diagram of carbide-carbon system used in this invention.

As one example of the phase diagram of the metal-carbon system contemplated by this invention, the phase diagram of chromium and carbon is shown in FIG. 2. It is clear from FIG. 2 that the peritectic structure ($Cr_3C_2$—C) and used by this invention as a fixed point has a peritectic point of 1811° C., as compared with the freezing point of pure chromium that is 1863° C., and a composition ratio of 37% (percentage by atoms of carbon).

Since $Cr_3C_2$ cannot exist at a temperature exceeding the peritectic point thereof, an attempt to elevate the temperature thereof results in separating this compound into solid graphite and a liquid chromium containing carbon at the composition ratio that takes place at the peritectic point. When the liquid chromium in which carbon remains in a saturated state is cooled conversely, it reaches the peritectic point thereof while precipitating primary crystal of graphite. If the liquid chromium is cooled even only slightly below 1811° C., it will react with the primary crystal of graphite precipitated previously and the carbon of the crucible and from solid $Cr_3C_2$.

Thus, the first melting or freezing action occurs at the peritectic point ("Solidification of Metal," written by Chalmers and translated jointly by Okamoto and Suzuki, published by Maruzen, p. 207). Since absorption or release of latent heat occurs and the change of temperature disappears during this first melting or freezing action, the state of sufficiently flat plateau can be observed in the temperature change curve.

Further, when the solidification at the peritectic point proceeds till the carbon compound covers the surface of graphite, the solidification at the peritectic point terminates because the graphite is no longer allowed to be in contact with the liquid phase. Since part of the metal still remains in the liquid phase, however, the cooling that follows induces further separation of $Cr_3C_2$ till the $Cr_3C_2$—$Cr_7C_3$ eutectic point is reached, at which time the aforementioned metal remaining in the liquid phase completely becomes solid, Thus, at the eutectic point, the second melting or freezing action takes place. Also at this time, since the absorption or the release of latent heat proceed, the change of temperature disappears and the temperature change curve allows observation of the state of sufficiently flat plateau.

In the case of using a crucible made of graphite as the aforementioned crucible composed of carbon, when the peritectic point that is the first melting point is surpassed, the graphite as the raw material of the crucible is dissolved, though slightly. When the temperature is decreased again, however, the cooling induces precipitation of excess graphite and allows resumption of the composition ratio of the peritectic point, $Cr_3C_2$—C, by the time at which the freezing point is reached. Thus, a melting and freezing plateau with high reproducibility is observed.

Since this invention uses a crucible composed of such carbon as graphite and uses as well a peritectic structure of the same carbon material or a carbon compound, it is inherently incapable of suffering the crucible material to become an impurity and inducing a depression of the freezing point.

Then, when the melting is carried out at the composition ratio of the peritectic by preparing a metal with added carbon the dissolving of the carbon from the crucible occurs sparingly and the degradation of the durability of the crucible by melting does not occur. Thus, owing to the use of a crucible made of graphite, this invention can eliminate such problem of durability of the crucible as experienced in the use of a crucible made of alumina.

Graphite manifests high emissivity and excels in workability. The crucible made of graphite, therefore, enables easy formation of a blackbody cavity manifesting sufficiently high emissivity and consequently proves to be suitable for the calibration of a radiation thermometer.

The thermometer calibrated at the fixed point of temperature shown in FIG. 1 produces marked enhancement of the accuracy of the calibration because the calibration is implemented by interpolation up to a high temperature range of 2776° C. Even when the thermometer is calibrated by using any of these temperature fixed points by extrapolation from that fixed point temperature, the accuracy of extrapolation is markedly enhanced as compared with the conventional method because the calibration has been implemented at a higher point than the copper point.

The fixed-point material that is used in this invention has no need for an expensive noble metal and allows stable procurement of highly pure powder at a low price. Further, this invention enables one temperature fixed-point cell to use temperatures of two melting and freezing points as temperature reference points and consequently permits a decrease in the number of kinds of fixed points required for the calibration of a thermometer. Thus, it not merely allows reduction of facilities but also brings a cut in the labor hour.

EXAMPLE 1

Figure 3A:
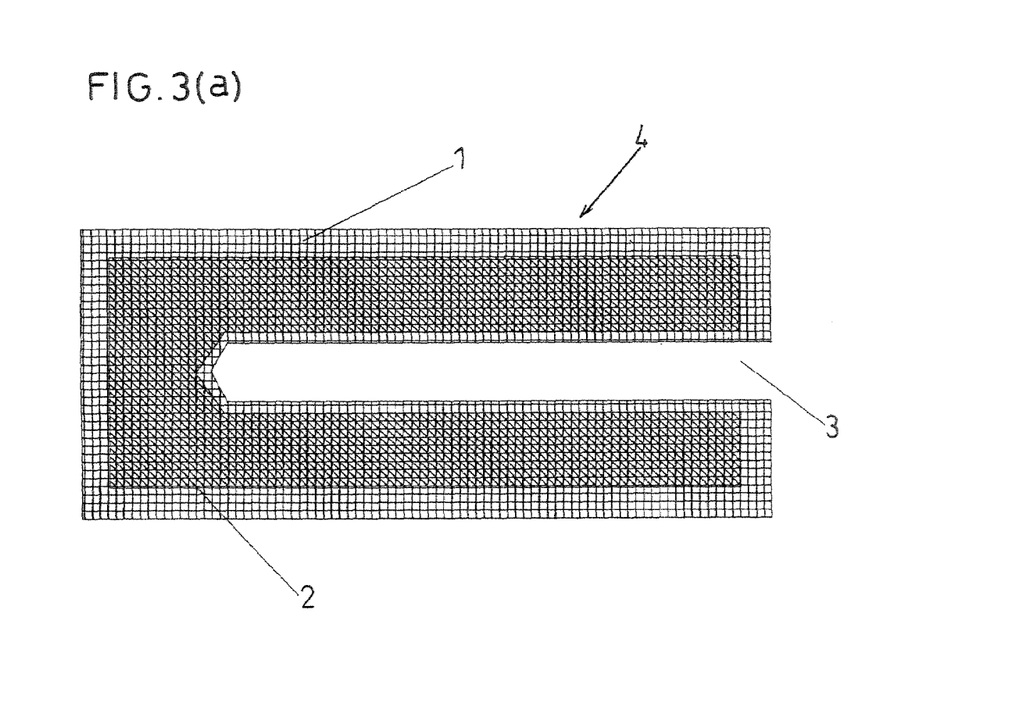

As an embodiment of this invention, the cross section of a temperature fixed-point cell 4 of Example 1 is illustrated in FIG. 3(a). The temperature fixed-point cell 4 is configured with a $Cr_3C_2$-carbon peritectic structure 2 prepared by adding 40 atom % of carbon to chromium and a crucible 1 made of graphite and having the $Cr_3C_2$-carbon peritectic structure cast therein. A blackbody cavity 3 is formed on one side of the temperature fixed-point cell 4.

Figure 3B:
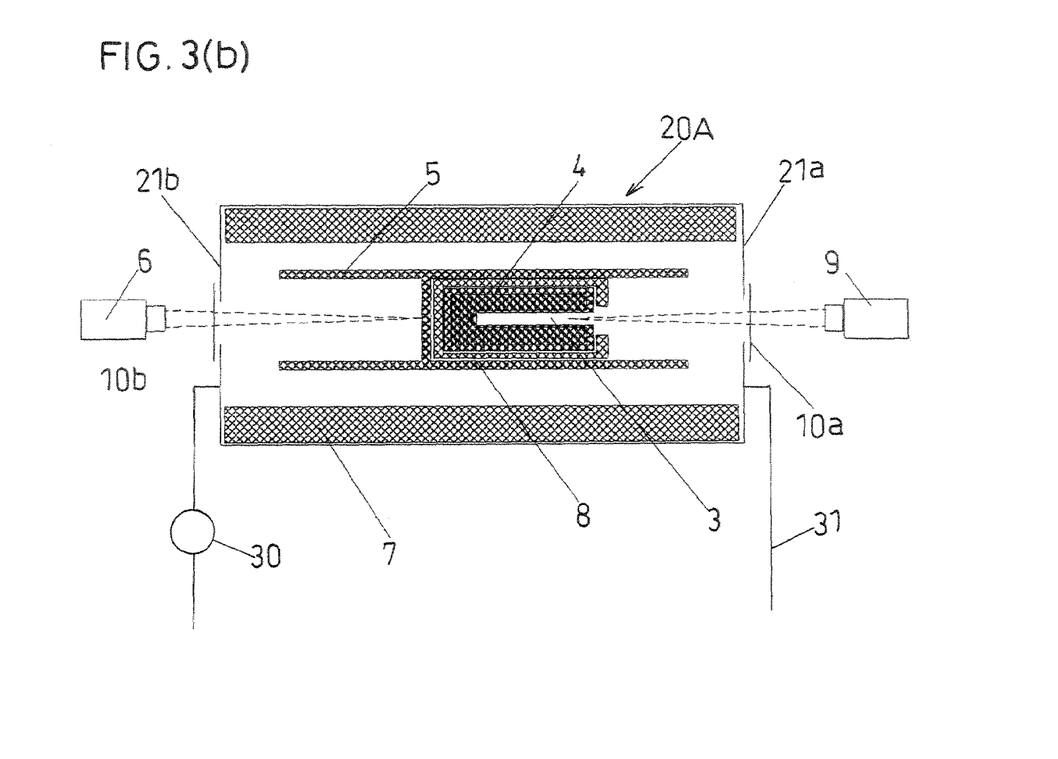

FIG. 3(b) is a cross section of a temperature fixed-point device of this invention that has mounted therein the temperature fixed-point cell 4 of Example 1. The temperature fixed-point device is furnished with a temperature-variable electric furnace 20A that is adapted to increase or decrease the ambient temperature of the temperature fixed-point cell 4 and cause a radiation thermometer 9 disposed outside the temperature-variable electric furnace 20A and allocated for calibration to measure the change of intensity of the light emitted from the temperature fixed-point cell 4. The terminal parts on both sides of the temperature-variable electric furnace 20A are closed with covers 21a and 21b and the covers 21a and 21b are provided at the centers thereof respectively with quartz glass windows 10a and 10b. Then, the temperature fixed-point cell 4 of Example 1 is so mounted in the temperature-variable electric furnace 20A that the blackbody cavity 3 thereof may be directed toward the quartz glass window 10a and is used subsequently for implementing an operation of calibrating the radiation thermometer 9 being calibrated.

The temperature-variable electric furnace 20A is composed of a furnace core tube 5 made of graphite and a heat insulating material 7 serving as a cover for it and is heated by an electric current through the furnace core tube 5. The temperature-variable electric furnace 20A has the entire interior thereof evacuated thoroughly by an evacuating means 30 furnished with a vacuum pump. Thereafter, the entire interior of the temperature-variable electric furnace 20A is placed under an inert gas atmosphere by introducing an inert gas with an inert gas supplying means 31 connected via a pipe to a gas source.

The aforementioned radiation thermometer 9 being calibrated is made to detect the light emitted by the blackbody cavity 3 across the quartz glass window 10a and measure the temperature of the temperature fixed-point cell 4 at the time that the ambient temperature of the temperature fixed-point cell 4 of Example 1 is increased or decreased. The radiation thermometer 9 being calibrated is calibrated based on the state of change of the measured temperature of the temperature fixed-point cell 4. Incidentally, the radiation thermometer 9 being calibrated may be a radiometer allocated for calibration or an illuminance meter allocated for calibration, By using another radiation thermometer 6 disposed outside the temperature-variable electric furnace 20A, the temperature in the furnace is monitored across the quartz glass window 10b disposed in the cover 21b at the other terminal and the resultant output signal is entered into a device for controlling a heating current. A heat insulating material 8 made of graphite is inserted in the periphery of the temperature fixed-point cell 4 of Example 1 with the object of improving the uniformity of temperature distribution and enhancing the electrical insulation of the reactor core tube and the fixed-point cell.

Figure 4A:
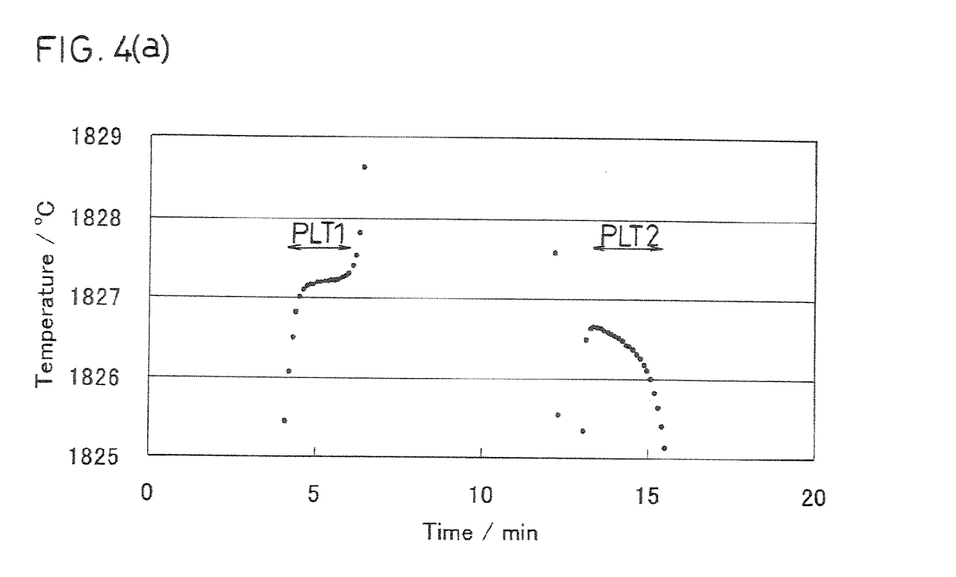
Figure 4B:
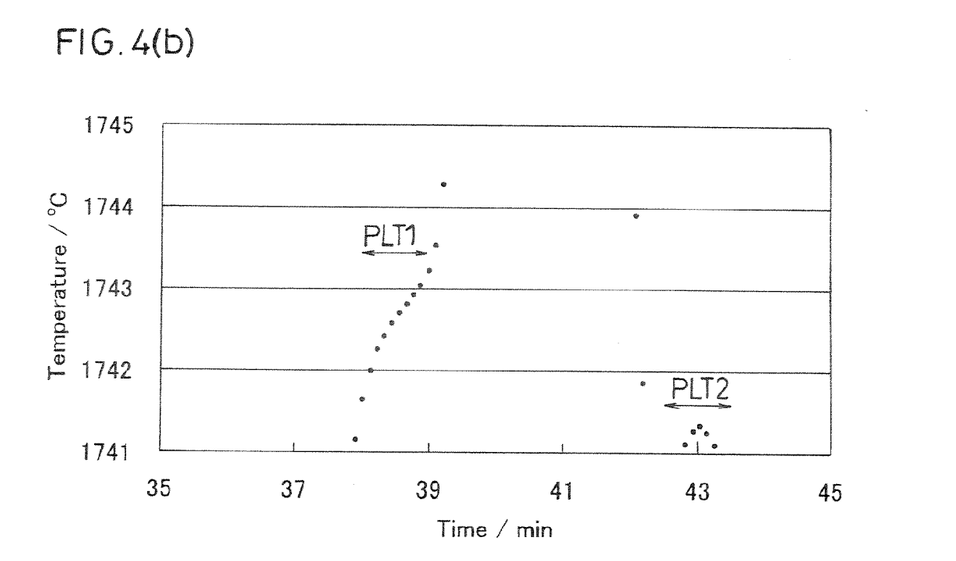

The outputs of the radiation thermometer 9 allocated for calibration in Example 1 are shown in FIG. 4(a) and FIG. 4(b). In the temperature change curve shown in FIG. 4(a), the process of temperature change in which the temperature increases rapidly to the neighborhood of 1827° C., increases at a slackened speed in this neighborhood of temperature, and increases rapidly again is illustrated. Then, in FIG. 4(a), the process of temperature change in which the temperature decreases rapidly to the neighborhood of 1827° C., decreases at a slackened speed in this neighborhood of temperature, and decreases rapidly again is illustrated. Also in the temperature change curve shown in FIG. 4(b), the temperature change is found to have an inclination similar to the curve of FIG. 4(a). To be specific, it is clear that the speed of temperature increase is slackened in the neighborhood of 1743° C. in the process of temperature increase and the speed of temperature decrease is slackened in the neighborhood of 1741° C. in the process of temperature decrease. Thus, in the temperature change curves shown in FIG. 4(a) and FIG. 4(b), the first and second melting and freezing plateaus (PLT1, PLT2) are respectively observed. The first melting and freezing plateaus (PLT1, PLT2) shown in FIG. 4(a) have resulted from the observation of the $Cr_3C_2$-carbon peritectic point of the aforementioned $Cr_3C_2$-carbon peritectic reaction and the second melting and freezing plateaus (PLT1, PLT2) shown in FIG. 4(b) have resulted from the observation of the $Cr_3C_2$—$Cr_7C_3$ eutectic point during the course of melting and freezing the liquid phase that survives the peritectic solidification in the $Cr_3C_2$-carbon peritectic structure 2. This fact clearly indicates that this invention enables fixed-point calibration of the radiation thermometer 9 allocated for calibration by utilizing at least either or both of the first and second plateaus.

EXAMPLE 2

Figure 5:
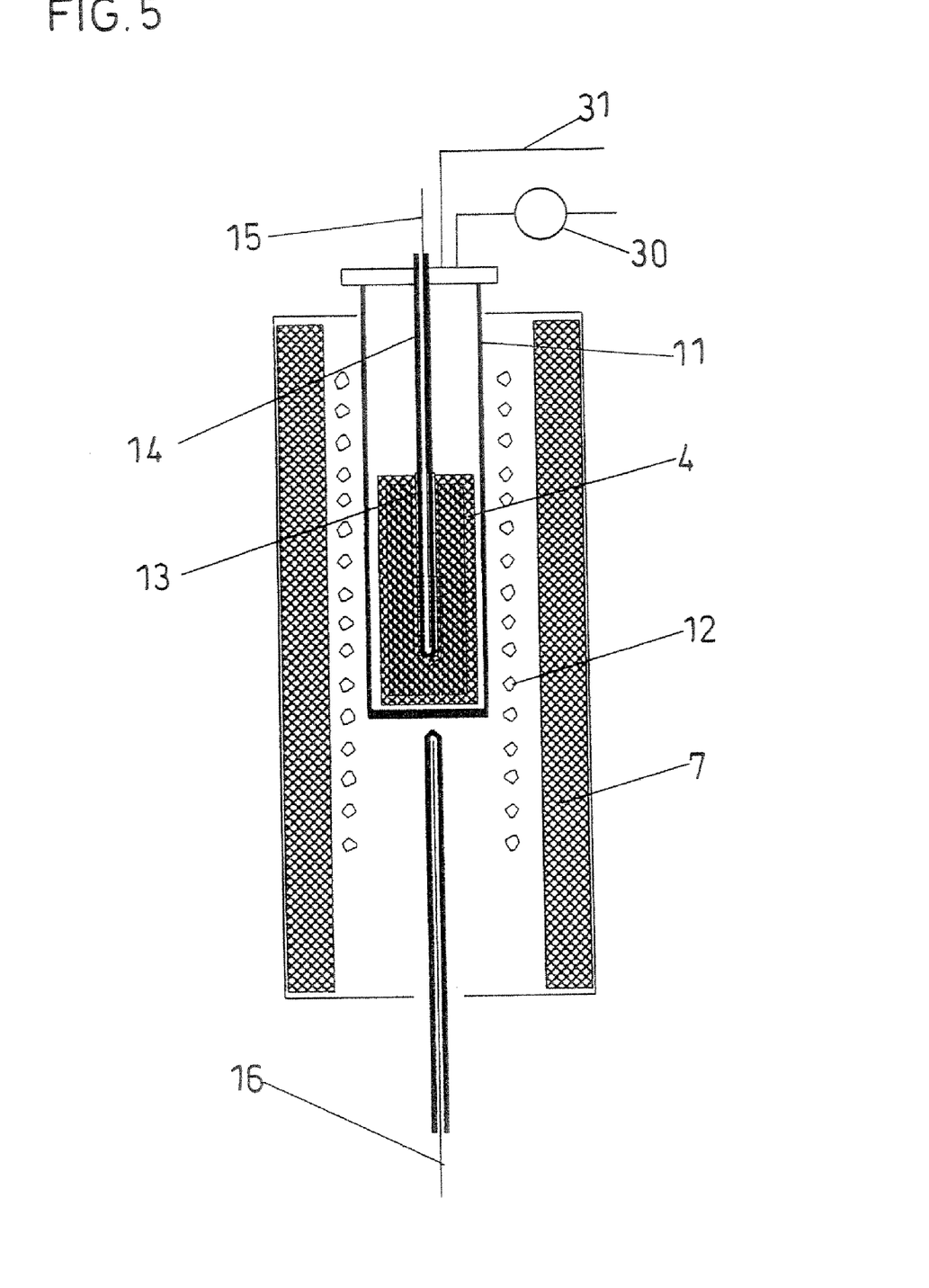
FIG. 5 is a cross section of a temperature fixed-point device of this invention having the temperature fixed-point cell of Example 2 disposed therein.

The cross section of a temperature fixed-point cell 4 of Example 2 of this invention and a temperature fixed-point device of this invention having the temperature fixed-point cell 4 disposed therein is illustrated in FIG. 5. The temperature fixed-point cell 4 of Example 2 is composed of an $Mn_7C_3$-carbon peritectic structure prepared by adding 30 atom % of carbon to manganese and a crucible made of graphite and having the $Mn_7C_3$-carbon peritectic structure cast therein.

The temperature fixed-point device illustrated in FIG. 5 is furnished with a temperature-variable electric furnace 20B adapted to increase or decrease the ambient temperature of the temperature fixed-point cell 4 of Example 2. The temperature-variable electric furnace 20B is configured with a furnace core tube 11 made of alumina and allowing the temperature fixed-point cell 4 of Example 2 to be mounted therein, a heater element 12 encircling the furnace core tube 11, and a heat insulating material 7 further encircling the furnace core tube 11 and is heated by an electric current through the furnace core tube 11.

A thermometer well 13 is disposed in the upper part of the temperature fixed-point cell 4 of Example 2 and an R-type thermocouple 15 allocated for calibration is inserted into the thermometer well 13 via a protecting tube 14 made of alumina The temperature fixed-point device illustrated in FIG. 5 causes the thermocouple 15 allocated for calibration to measure the temperature of the thermometer well 13. The temperature fixed-point cell 4 of Example 2 is used for the purpose of implementing the operation of calibrating the thermocouple 15 allocated for calibration.

The aforementioned furnace core tube 11 made of alumina has the interior thereof evacuated by the evacuating means 30 furnished with a vacuum pump. Thereafter, the interior of the aforementioned furnace core tube 11 is placed under an inert gas atmosphere by introducing an inert gas by an inert gas supplying means 31 connected to a gas source via a pipe.

The ambient temperature of the temperature fixed-point cell 4 of Example 2 is increased or decreased and the temperature of the thermometer well 13 is measured by the thermocouple 15 allocated for calibration via the protecting tube 14 made of alumina. The thermocouple 15 allocated for calibration is calibrated based on the state of temperature change of the temperature fixed-point cell 4 obtained by the measurement.

Another thermocouple 16 is inserted into the temperature-variable electric furnace 20B via the lower part of the furnace and made to monitor the temperature of the temperature-variable electric furnace 20B. The resultant output signal is entered into the device for controlling the heater element 12. The heater element 12 is controlled as divided into three zones, i.e. the upper, middle, and lower parts, in order that the uniformity of temperature distribution around the temperature fixed-point cell 4 may be optimized.

Figure 6:
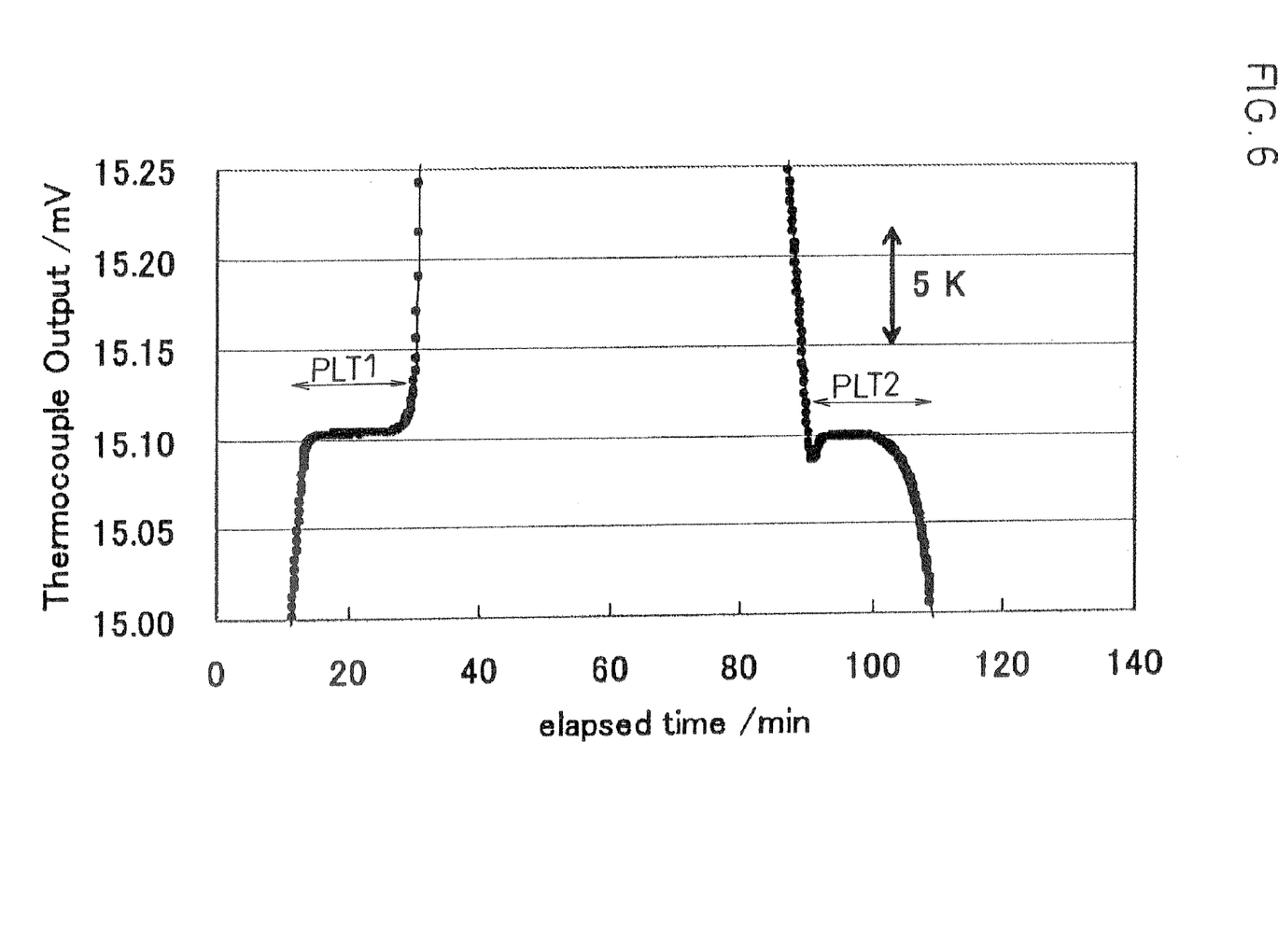
FIG. 6 is a drawing showing an example of the output obtained during the calibration of a thermometer allocated for calibration of FIG. 5.

The output obtained during the calibration of the thermocouple 15 is shown in

FIG. 6. Also in the temperature change curve shown in FIG. 6, it is observed that the temperature change has an inclination similar to the curve of FIG. 4(a) and FIG. 4(b). It is clear that the speed of temperature increase is slackened in the neighborhood of 1333° C. (15.10 mV) in the process of temperature increase and the speed of temperature decrease is slackened in the neighborhood of 1333° C. (15.10 mV) in the process of temperature decrease. Thus, melting and freezing plateaus (PLT1, PLT2) are observed in the temperature change curve shown in FIG. 6. This fact indicates that this invention enables fixed-point calibration of the thermocouple 15 allocated for calibration by utilizing at least either of the aforementioned PLT1 and PLT2.

The embodiment of the temperature fixed-point cell, the temperature fixed-point device, and the method for calibration of a thermometer that are contemplated by this invention have been described by reference to working examples. It goes without saying that this invention is not restricted to these examples but may be embodied in various examples within the scope of technical matters described in the appended claims.

Since this invention is configured as described above, it is applicable to a temperature fixed-point cell required in calibrating a radiation thermometer, a thermocouple and a thermometer used in a high temperature range exceeding 1000° C. and to a device for realizing a temperature fixed point.

What is claimed is:

1. A temperature fixed-point cell for calibrating a thermometer, comprising a crucible made of graphite and a fixed-point material enclosed in the crucible and characterized in that the temperature fixed-point cell is provided on one side thereof with a blackbody cavity and that the fixed-point material has a peritectic structure composed of carbon and a metal carbon compound.

2. A temperature fixed-point device comprising the temperature fixed-point cell set forth in claim 1 and a temperature-variable electric furnace that increases or decreases an ambient temperature of the temperature fixed-point cell and enables a change in temperature of the temperature fixed-point cell to be measured with a thermometer.

3. A temperature fixed-point cell according to claim 1, wherein the metal carbon compound is a carbon compound of manganese, chromium, aluminum, plutonium, or tungsten.

4. A temperature fixed-point cell according to claim 1, wherein the metal carbon compound is a carbon compound of tungsten.

5. A temperature fixed-point cell according to claim 1, wherein the metal carbon compound is a carbon compound of chromium.

6. A temperature fixed-point cell according to claim 1, wherein the metal carbon compound is a carbon compound of manganese.

7. A temperature fixed-point cell according to claim 1, wherein the metal carbon compound is a carbon compound of aluminum.

8. A temperature fixed-point device according to claim 2, wherein the metal carbon compound is a carbon compound of manganese, chromium, aluminum, plutonium, or tungsten.

9. A temperature fixed-point device according to claim 2, wherein the thermometer is a radiation thermometer or a thermocouple.

10. A temperature fixed-point device according to claim 2, wherein the metal carbon compound is a carbon compound of tungsten.

11. A temperature fixed-point device according to claim 2, wherein the metal carbon compound is a carbon compound of chromium.

12. A temperature fixed-point device according to claim 2, wherein the metal carbon compound is a carbon compound of manganese.

13. A temperature fixed-point device according to claim 2, wherein the metal carbon compound is a carbon compound of aluminum.

14. A method for calibrating a thermometer comprising steps of increasing or decreasing an ambient temperature of the temperature fixed-point cell set forth in claim 1, measuring a temperature of the temperature fixed-point cell with a thermometer, and calibrating the thermometer based on a state of change of the measured temperature.

15. A temperature fixed-point device comprising the temperature fixed-point cell of claim 1 disposed therein and a temperature-variable electric furnace and characterized in that the temperature-variable electric furnace increases or decreases an ambient temperature of the temperature fixed-point cell and enables a change in intensity of light emitted from the blackbody cavity of the temperature fixed-point cell to be measured with an illumination meter or a radiometer.

16. A temperature fixed-point cell for calibrating a thermometer, comprising a crucible made of graphite and a fixed-point material enclosed in the crucible and characterized in that the temperature fixed-point cell is provided on one side thereof with a blackbody cavity and that the fixed-point material has a peritectic structure composed of carbon and a carbide of silicon.

17. A temperature fixed-point cell for calibrating a thermometer, comprising a crucible made of graphite and a fixed-point material enclosed in the crucible and characterized in that the temperature fixed-point cell is provided on one side thereof with a blackbody cavity and that the fixed-point material has a peritectic structure composed of a structure selected from the group consisting of $Pu_2C_3$—$\beta PuC_2$, $PuC$—$Pu_2C_3$, and $\in Mn$—$Mn_7C_3$.

* * * * *